US008602662B1

(12) United States Patent
Mans

(10) Patent No.: US 8,602,662 B1
(45) Date of Patent: Dec. 10, 2013

(54) CAMERA AND ACCESSORIES CLAMPING MOUNT

(76) Inventor: John Mans, Boulder, CO (US)

( * ) Notice: Subject to any disclaimer, the term of this patent is extended or adjusted under 35 U.S.C. 154(b) by 159 days.

(21) Appl. No.: 13/289,204

(22) Filed: Nov. 4, 2011

Related U.S. Application Data

(60) Provisional application No. 61/410,193, filed on Nov. 4, 2010.

(51) Int. Cl.
G03B 17/00 (2006.01)
G03B 11/00 (2006.01)
F16M 13/00 (2006.01)
F16M 11/00 (2006.01)
F16C 11/06 (2006.01)

(52) U.S. Cl.
USPC ...... 396/428; 396/544; 248/160; 248/229.13; 248/231.51; 248/181.1; 248/276.1; 403/56

(58) Field of Classification Search
USPC .......... 396/544, 419, 421, 424, 428; 348/373; 248/160, 177.1, 181.1, 229.13, 231.51, 248/276.1; 403/56
See application file for complete search history.

(56) References Cited

U.S. PATENT DOCUMENTS 6,357,710 B1 * 3/2002 Fielden et al. ............. 248/276.1
2004/0089778 A1 * 5/2004 Valentine et al. ......... 248/229.13
2004/0211868 A1 * 10/2004 Holmes et al. ........... 248/231.71

* cited by examiner

Primary Examiner — Rochelle-Ann J Blackman

(57) ABSTRACT

A camera and accessories clamping mount that includes an assembly of ball and socket members rotatably and moveably interconnectable having an anterior end and a posterior end, a top connector disposed atop the anterior end and a bottom connector disposed on the posterior end, wherein the bottom connector is releasably attachable to a clamp, said clamp attachable to an extant surface, and an extant camera, or other accessory device having a ¼-20" female thread mount, is releasably attachable to the top connector, whereby said camera or other accessory device is supportable and positionable through a range of positions by means of the assembly of ball and socket members.

18 Claims, 3 Drawing Sheets

US 8,602,662 B1

CAMERA AND ACCESSORIES CLAMPING MOUNT

CROSS-REFERENCE TO RELATED APPLICATIONS

Figure 1:
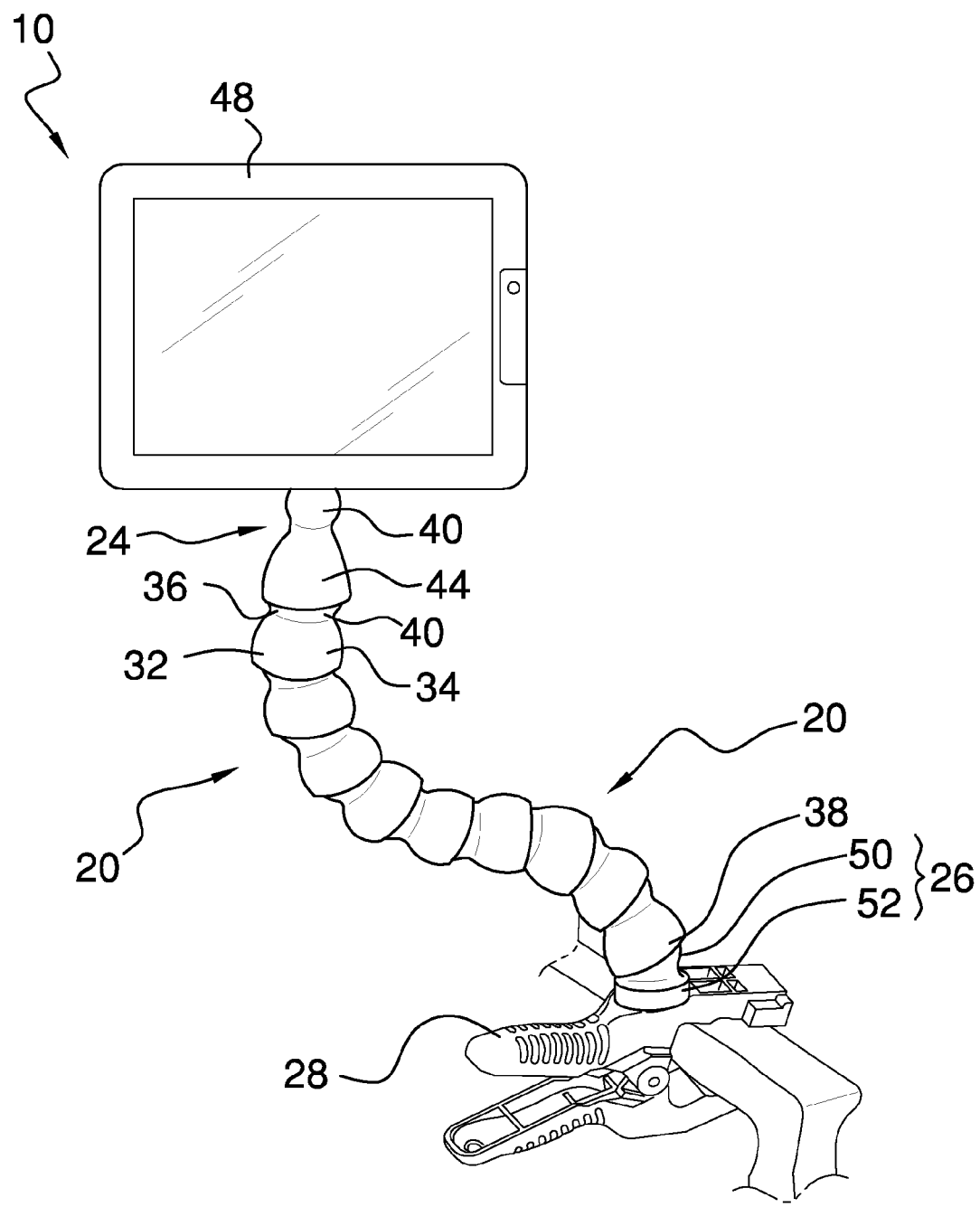

U.S. Provisional Patent Application No. 61/410,193 filed Nov. 4, 2010

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of camera and accessories clamping mounts are known in the prior art. However, what is needed is a camera and accessories clamping mount that includes an assembly of ball and socket members rotatably and moveably interconnectable having an anterior end and a posterior end, a top connector disposed atop the anterior end and a bottom connector disposed on the posterior end, wherein the bottom connector is releasably attachable to a clamp, said clamp attachable to an extant surface, and an extant camera, or other accessory device having a ¼-20" female thread mount, is releasably attachable to the top connector, whereby said camera or other accessory device is supportable and positionable through a range of positions by means of the assembly of ball and socket members.

FIELD OF THE INVENTION

The present invention relates to a camera and accessories clamping mount, and more particularly, to a camera and accessories clamping mount that includes an assembly of ball and socket members rotatably and moveably interconnectable having an anterior end and a posterior end, a top connector disposed atop the anterior end and a bottom connector disposed on the posterior end, wherein the bottom connector is releasably attachable to a clamp, said clamp attachable to an extant surface, and an extant camera, or other accessory device having a ¼-20" female thread mount, is releasably attachable to the top connector, whereby said camera or other accessory device is supportable and positionable through a range of positions by means of the assembly of ball and socket members.

SUMMARY OF THE INVENTION

The general purpose of the camera and accessories clamping mount, described subsequently in greater detail, is to provide a camera and accessories clamping mount which has many novel features that result in a camera and accessories clamping mount which is not anticipated, rendered obvious, suggested, or even implied by prior art, either alone or in combination thereof.

The present camera and accessories clamping mount has been devised to mount, position, and support an extant camera, or other device having a ¼-20" female thread mount, upon a plurality of extant surfaces, as desired. The present camera and accessories clamping mount includes an assembly of releasably interconnectable ball and socket members, a top connector having a vertically oriented fastener upwardly disposed thereon, and a bottom connector releasably attachable to a clamp, whereby an extant camera or other device may be securely mounted and positionable upon a plurality of relevant surfaces, as desired. In the preferred embodiment herein specified, the fastener is a ¼-20" male screw, releasably attachable to an extant device having a ¼-20" female thread mount.

Each of the ball and socket members comprising the assembly include a generally spherical ball portion and a hollow generally spherical socket portion, the ball portion and socket portion joined at a generally cylindrical waist. Each of the ball and socket member socket portions have an inner radius approximately equal to the outer radius of each of the ball portions of the ball and socket members comprising the assembly, whereby a socket section of a particular ball and socket member generally encapsulates a ball portion of an interconnected ball and socket member.

The ball portion of a first ball and socket member is releasably interconnectable with a socket portion of a second ball and socket member. Thusly, a ball portion of a particular ball and socket member moveably, rotatably, and releasably interconnects with the socket portion of an anteriorly disposed ball and socket member, and a socket portion of a particular ball and socket member moveably, rotatably, and releasably interconnects with the ball portion of a posteriorly disposed ball and socket member. Additional ball and socket members may be releasably interconnected to increase or decrease the length and support capacity of the assembly, as desired.

Therefore, the assembly includes at least two ball and socket members. The assembly culminates in an anterior end and a posterior end. Each of the ball and socket members is releasably moveable and rotatable within the assembly, each ball and socket members rotatable through 360 degrees within a transverse plane relative the waist, and moveable and rotatable through approximately 45-65 degrees within a sagittal and a coronal plane relative the waist.

A top connector is disposed atop the ball portion of the ball and socket member at the assembly anterior end. The top connector includes a head portion, a fastener, and a connection sleeve. The fastener is disposed vertically upward atop the head section, said fastener configured to releasably engage with an extant female thread mount. The connection sleeve is disposed distending downward from the head section, the connection sleeve generally encapsulating and releasably engaging with the ball portion of the ball and socket member disposed at the assembly anterior end.

The top connector is rotatable through 360 degrees within a transverse plane relative the fastener, enabling a user to turn the top connector to screw the fastener into an extant female thread mount, as desired when mounting an extant device, such as a camera, to the camera and accessories clamping mount for use. For added purchase when rotating the top connector to releasably attach an extant camera, or other device, to the present camera and accessories clamping mount, a pair of flanged wings are disposed on opposite sides of the top connector.

The bottom connector is disposed at the assembly posterior end. The bottom connector includes a connector ball portion and a collar portion. The connector ball portion releasably, rotatably, and moveably interconnects with the socket portion of the ball and socket member disposed on the assembly posterior end. The collar portion releasably engages with the clamp.

The clamp includes a first clamp member and as second clamp member. The first clamp member has a first outward surface, a first inward surface, a first handle portion, a first central portion, and a first front portion. The second clamp member is generally enantiomorphic with respect to the first clamp member, having a second outward surface, a second inward surface, a second handle portion, a second central portion, and a second front portion. The second clamp member is pivotally attached to the first clamp member by means of a pivot disposed between the first central portion and a second central portion.

A camera, or other accessory device having a ¼-20" female thread mount, may therefore be releasably secured to the present camera and accessories clamping mount and securely positioned upon an extant surface with a range of motion afforded by the assembly of rotatable and moveable interconnectable ball and socket members, enabling a steady support and readily changeable perspective when photographing, filming, lighting, scoping, or performing other functions desirable with an extant device having a ¼-20" female thread mount applicable and available for such use. Furthermore, the assembly may be lengthened or shortened, as desired, with the addition or subtraction of ball and socket members therefrom.

Thus has been broadly outlined the more important features of the present camera and accessories clamping mount so that the detailed description thereof that follows may be better understood and in order that the present contribution to the art may be better appreciated.

Objects of the present camera and accessories clamping mount, along with various novel features that characterize the invention are particularly pointed out in the claims forming a part of this disclosure. For better understanding of the camera and accessories clamping mount, its operating advantages and specific objects attained by its uses, refer to the accompanying drawings and description.

BRIEF DESCRIPTION OF THE DRAWINGS FIGURES

Figure 2:
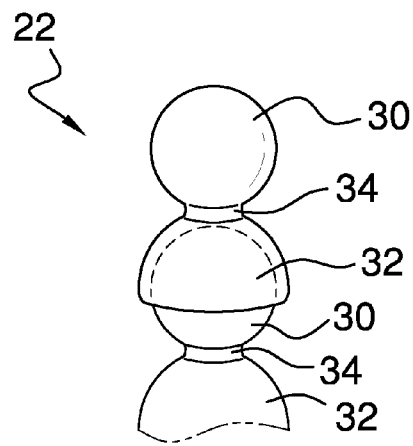
Figure 3:
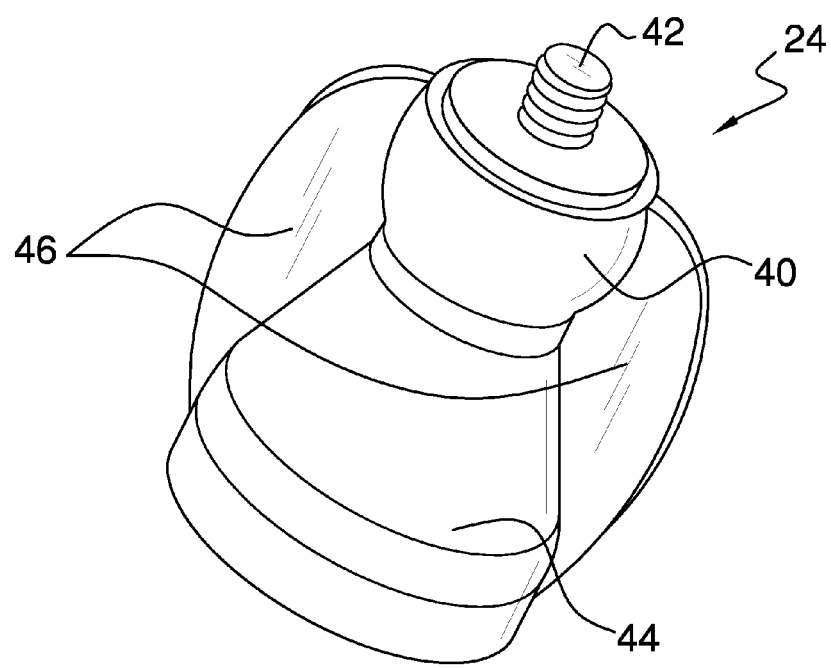
Figure 4:
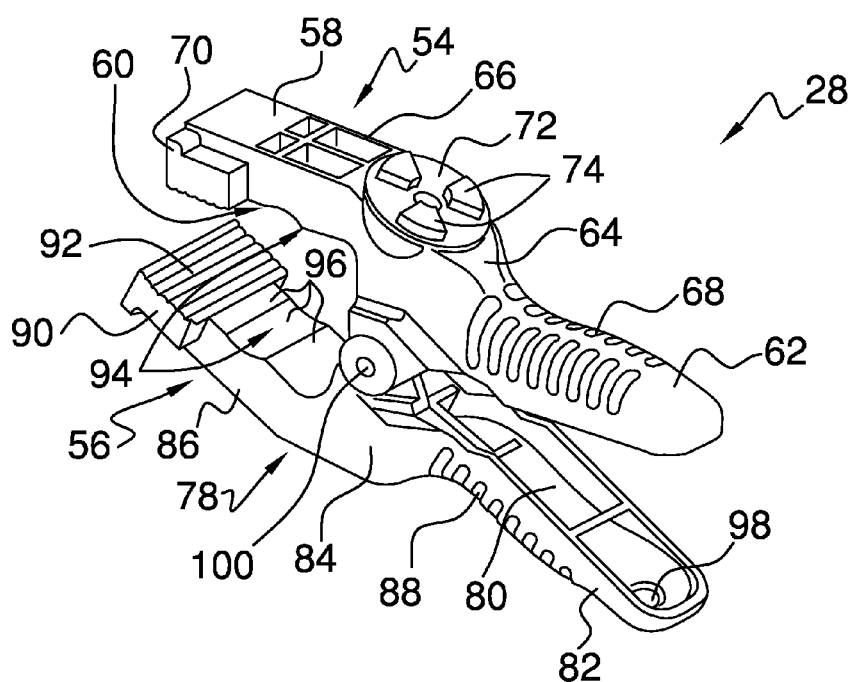

FIG. 1 is an in-use isometric view.
FIG. 2 is a side view of a ball and socket member.
FIG. 3 is an isometric view of a top connector.
FIG. 4 is an isometric view of a clamp.

DETAILED DESCRIPTION OF THE DRAWINGS

With reference now to the drawings, and in particular FIGS. 1 through 4 thereof, example of the instant camera and accessories clamping mount employing the principles and concepts of the present camera and accessories clamping mount and generally designated by the reference number 10 will be described.

Referring to FIGS. 1 through 4 a preferred embodiment of the present camera and accessories clamping mount 10 is illustrated.

The camera and accessories clamping mount 10 includes a rotatable interconnected assembly 20 of ball and socket members 22, a top connector 24, a bottom connector 26, and a clamp 28. Each of the ball and socket members 22 includes a generally spherical ball portion 30 and a hollow, generally spherical socket portion 32 joined at a generally cylindrical waist 34. The ball portion 30 has an outer radius generally equal to, or marginally less than, the inner radius of the socket portion 32. The waist 34 has a radius considerably less than the outer radius of the ball portion 30.

The ball portion 30 of a particular ball and socket member 22 is rotatably interconnectable with the socket portion 32 of an overlying ball and socket member 22, and the socket portion 32 of a particular ball and socket member 22 is rotatably interconnectable with the ball portion 30 of an underlying ball and socket member 22. The ball and socket members 22 are thusly interconnectable to form the assembly 20, which assembly 20 culminates at an anterior end 36 and a posterior end 38. Each ball and socket member 22 is releasably interconnectable. Additional ball and socket members 22 may be added into the assembly 20, or ball and socket members 22 subtracted from the assembly 20, as desired.

The top connector 24 is disposed atop the ball portion 30 at the assembly 20 anterior end 36. The top connector 24 includes a head portion 40, a fastener 42 vertically disposed atop the head portion 40, and a connection sleeve 44 disposed distending downwards from the head portion 40. Each of a pair of flanged wings 46 is disposed on opposing sides of the connection sleeve 44 and the head portion 40.

The connection sleeve 44 is configured to releasably mate with the ball portion 30 of the ball and socket member 22 disposed on the assembly 20 anterior end 36, the connection sleeve 44 generally encapsulating the ball portion 30. The top connector 24 is thereby rotatable through 360 degrees in a transverse plane relative the fastener 42, the top connector 24 rotatable about the ball portion 30 of the ball and socket member 22 disposed on the assembly 20 anterior end 36. The pair of flanged wings 46 offer purchase to a user turning the top connector 24, as desired when fastening an extant camera 48, or other accessory, to the device 10.

The bottom connector 26 is disposed on the assembly 20 posterior end 38. The bottom connector 26 includes a connector ball portion 50 and a collar portion 52. The connector ball portion 50 is rotatably interconnected with the socket portion 32 of the ball and socket member 22 disposed on the assembly 20 posterior end 38. The collar portion 52 is attached to the clamp 28, as will be described subsequently.

Although the clamp 28 is releasably attachable to the bottom connector 26 embodiments are envisioned wherein the bottom connector 26 is affixed to the clamp 28; the device 10 should not be considered limited with respect to the bottom connector 26 interconnection with the clamp 28.

The clamp 28 includes a first clamp member 54 and a second clamp member 56. The first clamp member 54 includes a first outward surface 58, a first inward surface 60, a first handle portion 62, a first central portion 64, and a first front portion 66. The first central portion 64 is disposed arcing upwardly relative the first handle portion 62 and the first front portion 66 is disposed generally right angularly on the first central portion 64, the first front portion 66 generally parallel with the first handle portion 62. A first grip area 68 is disposed on the first outward surface 58 of the first handle portion 62 and a first tip 70 is disposed on the first front portion 66.

A discoid attachment member 72 is disposed on the first outward surface 58 of the first front portion 66 proximal to the first central portion 64. The discoid attachment member 72 includes an upwardly disposed plurality of raised surfaces 74, each of the plurality of raised surfaces 74 releasably engageable with the collar portion 52 of the bottom connector 26.

The second clamp member 56, generally enantiomorphic with respect to the first clamp member 54, includes a second outward surface 78, a second inward surface 80, a second handle portion 82, a second central portion 84, and a second front portion 86. A second grip area 88 is disposed on the second outward surface 78 of second handle portion 82 and a second tip 90 is disposed on the second front portion 86. A hole 98, configured to removably receive an extant carabineer therethrough, is disposed in the second handle portion 82.

The first and second handle portions 62, 82 are substantially convex in cross-section and the first and second front portions 66, 86 are substantially parallelepiped. The first tip 70 and the second tip 90 are wider than the respective first front portion 66 and the second front portion 86. Each of the first tip 70 and the second tip 90 have a gripping surface 92 disposed on the respective first inward surface 60 and the second inward surface 80. Each of the first tip 70 and the second tip 90 may be pivotally attached to the respective first front portion 66 and the second front portion 86. In the preferred embodiment herein specified, the gripping surface 92 is made of rubber.

The clamp 28 also includes a contact portion 94. The contact portion 94 is disposed on the respective first 60 and second 80 inward surfaces of each of the first 66 and second 86 front portions. The contact portion 94 includes a plurality of concave undulations 96 disposed between each of the first 70 and second 90 tips and the respective first 64 and second 84 central portions. These concave undulations 96 are configured to releasably engage with extant surfaces when the clamp 28 is used, as desired, to grip surfaces wider than such surfaces as the first 70 and second 90 tips can effectually grasp.

A pivot 100 interconnects the first central portion 64 and the second central portion 84. When the first and second handle portions 62, 82 are squeezed together, the first and second front portions 66, 86 open, and the clamp 28 is releasably secureable to an extant surface, as desired.

The bottom connector 26 is releasably fastenable to the discoid attachment member 72, and the clamp 28 releasably fastens to an extant surface. An extant camera 48, or other accessory, mounted to the device 10 is thereby supportable and positional through a range of positions by means of each of the plurality of ball and socket members 22 rotatably interconnected throughout the assembly 20, enabling a steady support and readily changeable perspective when photographing, filming, lighting, scoping, or performing other functions as desired with an extant device having a ¼-20" female thread mount.

What is claimed is:

1. A camera and accessories clamping mount comprising:
    an assembly of rotatable interconnectable ball and socket members, each of the ball and socket members comprising:
        a generally spherical ball portion;
        a generally spherical socket portion disposed underlying the ball portion;
        a generally cylindrical waist section disposed between the ball portion and the socket portion;
    a top connector disposed on an anterior end of the assembly, the top connector comprising:
        a head portion;
        a fastener vertically disposed atop the head portion, said fastener being configured to engage a camera;
        a connection sleeve disposed distending downwards from the head portion;
        a bottom connector disposed on a posterior end of the assembly;
        a pair of flanged wings, each of the pair of flanged wings being disposed on opposing sides of the connection sleeve and the head portion;
    a clamp, releasably attachable to the bottom connector, the clamp comprising:
        a first clamp member comprising:
            a first outward surface;
            a first inward surface;
            a first handle portion;
            a first central portion;
            a first front portion;
            a discoid attachment member disposed on the outward surface of the front portion proximal to the central portion;
        a second clamp member, generally enantiomorphic with respect to the first clamp member, the second clamp member comprising:
            a second outward surface;
            a second inward surface;
            a second handle portion;
            a second central portion;
            a second front portion; and
    wherein each ball and socket member is moveably and rotatably interconnectable within the assembly, a socket portion of a particular ball and socket member interconnectable with the ball portion of a posteriorly disposed ball and socket member, the connection sleeve is rotatably interconnectable to the assembly anterior end, the bottom connector releasably fastens to the discoid attachment member, and the clamp releasably fastens to an extant surface, whereby an extant camera, or other accessory, mounted to the fastener is supported and positional through a range of positions by means of the assembly of ball and socket members.

2. The camera and accessories clamping mount of claim 1 wherein each socket portion has an inner radius generally equal to the outer radius of each ball portion whereby each socket portion generally rotatably encompasses each ball portion.

3. The camera and accessories clamping mount of claim 2 wherein each ball and socket member is releasably interconnectable within the assembly.

4. The camera and accessories clamping mount of claim 3 wherein each ball portion is rotatable within each socket portion, each ball portion rotatable through 360 degrees in a transverse plane relative the waist.

5. The camera and accessories clamping mount of claim 4 wherein each ball portion is rotatable within each socket portion, each ball portion rotatable through approximately 45-65 degrees in a coronal plane relative the waist and approximately 45-65 degrees in a sagittal plane relative the waist.

6. The camera and accessories clamping mount of claim 5 wherein the bottom connector comprises a connector ball portion and a collar portion, the collar portion releasably attachable to the clamp discoid attachment member and the connector ball portion rotatably interconnected with the socket portion of the ball socket member disposed on the assembly posterior end.

7. The camera and accessories clamping mount of claim 6 wherein the clamp further comprises:
    a pivot interconnecting the first central portion and the second central portion;
    a first grip area disposed on the first outward surface of first handle portion;
    a second grip area disposed on the second outward surface of second handle portion;
    a first tip disposed on the first front portion;
    a second tip disposed on the second front portion;
    wherein the first and second handle portions are substantially concave in cross-section and the first and second front portions are substantially parallelepiped.

8. The camera and accessories clamping mount of claim 7 wherein the clamp comprises a contact portion, the contact portion disposed on the respective first and second inward surfaces of each of the first and second front portions.

9. The camera and accessories clamping mount of claim 8 wherein the first tip and the second tip are wider than the respective first front portion and the second front portion, each of the first tip and the second tip having a gripping surface disposed on the respective first inward surface and the second inward surface.

10. The camera and accessories clamping mount of claim 9 wherein the contact surface includes a plurality of concave undulations between each of the first and second tips and each of the respective first and second central portions.

11. The camera and accessories clamping mount of claim 10 wherein the discoid attachment member further comprises a plurality of raised surfaces, each of the plurality of raised surfaces releasably engageable with the collar portion of the bottom connector.

12. The camera and accessories clamping mount of claim 11 wherein the second clamp member comprises a hole disposed in the second handle portion, said hole configured to releasably receive an extant carabineer therethrough.

13. The camera and accessories clamping mount of claim 12 wherein the gripping surface is made of a polymeric material.

14. The camera and accessories clamping mount of claim 13 wherein a polymeric material is disposed on at least one of the plurality of concave undulations of the contact surface.

15. The camera and accessories clamping mount of claim 14 wherein the collar portion is releasably attachable to the discoid attachment member by means of a clamp fastener.

16. The camera and accessories clamping mount of claim 15 wherein the clamp fastener is a bolt.

17. The camera and accessories clamping mount of claim 16 wherein the first tip and the second tip are pivotally attached to the first front portion and the second front portion.

18. The camera and accessories clamping mount of claim 17 wherein the fastener is ¼-20" screw.

* * * * *